United States Patent [19]

Smith et al.

[11] 3,928,060

[45] Dec. 23, 1975

[54] COMPOSITION AND METHOD FOR INHIBITING ASBESTOS FIBER DUST

[75] Inventors: Malcolm Kent Smith, Mountainside; Robert Winslow White, Califon, both of N.J.

[73] Assignee: N L Industries, Inc., Hightstown, N.J.

[22] Filed: Aug. 13, 1973

[21] Appl. No.: 387,919

[52] U.S. Cl......... 106/308 Q; 117/126 AQ; 106/309
[51] Int. Cl.².............................................. C08J 7/04
[58] Field of Search............ 106/308 Q, 309, 306; 117/126 AQ; 65/3

[56] References Cited
UNITED STATES PATENTS

| | | | |
|---|---|---|---|
| 2,626,213 | 1/1953 | Novak | 106/308 Q |
| 2,668,785 | 2/1954 | Jefferson | 117/126 AQ |
| 2,882,177 | 4/1959 | Newton | 106/308 Q |

*Primary Examiner*—Winston A. Douglas
*Assistant Examiner*—J. V. Howard
*Attorney, Agent, or Firm*—Darby & Darby

[57] ABSTRACT

The tendency of asbestos fibers to become airborne as particles under dusting conditions is inhibited by treating them with the ester of a polyhydroxy compound and a $C_1$ through $C_6$ carboxylic acid or a derivative thereof.

18 Claims, No Drawings

COMPOSITION AND METHOD FOR INHIBITING ASBESTOS FIBER DUST

This invention relates to a method for inhibiting the release of asbestos fibers into the atmosphere in the form of dust. More specifically, the invention relates to a method of treating asbestos fibers to control the dispersion of released fibers into the atmosphere as dust particles. Also, the invention relates to a coated asbestos product.

It has long been recognized that exposure to asbestos fibers of sufficient intensity and long enough duration is causally related to asbestosis, lung cancers, and mesothelioma.

Asbestos is a native magnesium calcium silicate and is generally found in two different forms, chrysotile, or white asbestos and amphiboles (crocidolite), or blue asbestos. Both varieties appear in compact form or in silky fibers which are acid and heat resisting and may be spun or woven. The term "asbestos" as used herein includes not only the preceding varieties, but also those known as amosite, termolite, anthophyllite and actinolite.

The fibrous or colloidal forms of asbestos especially chrysotile asbestos, are useful as viscosity control additives, thixotropes, extenders and reinforcing agents in a broad range of plastisols and organosols which are in turn employed in adhesives, coatings, paints, and mastics. Because of their geometry, chrysotile asbestos fibers are used to provide whisker reinforcement in rigid and plasticized PVC, nylon molding materials and various other resin systems. Asbestos fibers are also used in the manufacture of vinyl asbestos floor tile to provide dimensional stability and high brightness.

In view of the undisputed grave consequences to humans from continued exposure to asbestos fibers, it is essential that the exposure of individuals who must work with such materials be minimized to the greatest extent possible. To this end, the Federal Occupational Safety and Health Act of 1970 has been amended to provide maximum permissible concentrations of asbestos fibers. The revision limits the occupational exposure of an individual worker to an 8-hour time-weighted average (TWA) airborne concentration of asbestos dust not exceeding five fibers longer than fiver micrometers, per cubic centimeter of air. Commencing in 1974, the standard will become more stringent and the eight hour TWA concentration of asbestos fibers longer than five micrometers will not be allowed to exceed two fibers per cubic centimeter of air. In view of the critical importance of asbestos as a constituent in many different products, and the lack of inexpensive substitutes, the art has been actively seeking a method of inhibiting the release of asbestos particles and fibers into the air as dust. Typically, this release occurs during the handling or pouring of asbestos fibers incident to their incorporation in a finished chemical product, e.g., paint, resin, etc.

Although several different procedures have been used to treat asbestos fibers and particles in order to reduce or limit their ability to become airborne, these treatments have concomitantly diminished or eliminated altogether those specific properties which an asbestos additive was expected to provide to a given chemical product. Accordingly, these procedures for limiting the dusting tendency of asbestos fibers are of little or no practical value since they eliminate the performance criteria (e.g., thixotropic, thickening, coflocculating, softening, bulking, and viscosity control) which an asbestos ingredient is normally expected to provide in a given formulation. For example, one procedure which has been proposed for reducing the dusting level of chrysotile asbestos fibers involves treating the raw fibers with methyl acetyl ricinoleate or ricinoleic acid. However, treatment of chrysotile asbestos fibers with either of these materials results in severe lumping of the product and virtually eliminates its utility as a thixotropic agent or rheological additive in organic resins.

It has now been unexpectedly discovered that the ability of asbestos fibers to become airborne is greatly reduced by treating them with an anti-dusting agent which is the ester of a polyhydroxy derivative of a branched or straight chain $C_2$ through $C_6$ alkyne and a $C_1$ through $C_6$ carboxylic acid or anhydride. The reaction product may be generally described as a polyhydroxy compound which has been partially esterified, from approximately about 0 to about 80% with lower aliphatic acids. Treatment of chrysotile, amosite, crocidolite, tremolite, anthophyllite and actinolite asbestos fibers or particles with the ester reaction product of this invention provides a marked reduction in the ability of the fibers to become airborne as dust particles which may be inhaled by humans. When compared with untreated asbestos fibers, the asbestos fibers treated in accordance with this invention generally show about a three to four-fold decrease in the number of airborne particles released under dusting conditions. Furthermore, the special properties (i.e., viscosity control, thixotropic, rheological, etc.) of the asbestos fibers of this invention are unaffected, hence, their utility in those specialized applications for which asbestos fibers are usually employed is not diminished.

It is therefore an object of this invention to provide a method for treating asbestos fibers to reduce or limit their ability to become airborne.

Another aspect of this invention is to provide a method for reducing the dusting level of asbestos particles to comply with the Federal Occupational Safety Hazard Act requirements.

Another aspect of the invention is the provision of treated asbestos particles, including fibers, tendrils, pellets and granules having reduced dusting levels as compared to their untreated counterparts.

Other objects and advantages of the present invention will become apparent from a consideration of the ensuing description.

Briefly stated, this invention involves treating asbestos fibers on the order of about 1 to about 25 micrometers in length with an anti-dusting agent which is the ester of a polyhydroxy derivative of a branched or straight chain $C_2 - C_6$ alkyne and a $C_1$ through $C_6$ carboxylic acid or anhydride. Generally, the polyhydroxy and acidic components are reacted in equimolar proportions, however the proportion of reactants is not critical and may be adjusted to provide minimum dusting levels for different varieties of asbestos ores and fibers.

Especially useful as anti-dusting agents are those polyhydroxy compounds which have been partially esterified (from about 0 to about 80%, preferably between about 10% and 30%) with lower ($C_1 - C_6$) aliphatic carboxylic acids or their anhydrides. Suitable polyhydroxy alkyne derivatives include ethylene, propylene, and butylene glycols, glycerine, pentaerythritol, di- and tri-pentaerythritol, sorbitol and hexoses, such as dextrose, trimethylolethane, and trimethylol propane. Preferably trimethylol propane is employed as the polyhydroxy reactant in preparing the anti-dusting agents of the invention. Esterification of the foregoing polyhydroxy compounds is carried out with aliphatic $C_1 - C_6$ carboxylic acids such as formic, acetic, propionic, butyric, isobutyric, valeric, trimethylacetic or caproic acids; or their anhydride analogs or unsaturated analogs. Preferably the anhydrides of the foregoing acids, especially acetic and butyric acid anhydride, are employed in carrying out the esterification reaction.

When the esterification is carried out using one of the foregoing acids, the reaction is preferably conducted in the presence of a suitable catalyst such as stannous chloride, P-toluene sulfonic acid or sulfuric acid. The catalyst is not required when the anhydride of the selected acid (e.g., acetic anhydride or butyric anhydride) is employed in esterifying the polyhydroxy compound. The preferred anti-dusting ester of this invention is prepared by reacting trimethylol propane and acetic anhydride in approximately equimolar amounts to provide an antidusting agent having the approximate structure depicted in FIG. 1.

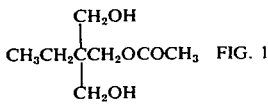

FIG. 1

The anti-dusting agents of this invention are especially useful in inhibiting the dusting levels of short purified chrysotile asbestos fibers of the type available from Union Carbide Corporation, Bound Brook, N.J., under the trademark CALIDRIA asbestos. Typical physical characteristics of one form of these short purified chrysotile asbestos fibers are set forth in Table I below.

Table I

| Typical Physical Characteristics | |
| --- | --- |
| Specific Gravity | 2.45 |
| Moisture Content, % by Wt. | 2.0 max. |
| Surface Area, Sq. meters per gram | 60 approx. |
| Reflectance, G.E. Brightness | 72–76 |
| Nature of Surface Charge | Electropositive (Cationic) |
| pH in Water (2% slurry) | 9.0 |
| Bulking Value, gal./100 lb. | 4.8 |
| Oil Absorption (DOP) lb./100 lb. | 120 |
| Refractive Index, $n_d$ 25°C | 1.54–1.56 |
| Aspect Ratio (Average L/D) | 200:1 |
| Tensile Strength, psi | 824,000 max. |
| Tensile Modulus, psi | $23.2 \times 10^6$ |
| Dry Bulk Density, lb./cu. ft. (fully aerated) | 4 |
| Shipping Density, lb./cu. ft. | 12–14 |

The Union Carbide "Calidria" asbestos fibrils differ from conventional chrysotile asbestos because of the unusual mineralogy of the California deposit from which they are mined. Also, they contain a higher concentration of fully liberated asbestos fibrils (whiskers) than other chrysotile products.

Asbestos fibers which are to be treated according to the invention are charged into a large tumbler or mixing device. After the dry asbestos fibers have been loaded, they are treated, e.g., by spraying with from about 2 to about 25 parts by weight of the esterified anti-dusting agent of this invention. The spraying operation is generally carried out over a period of time between 5 minutes and several hours, generally about 30 minutes. The exact treatment time is not critical and will vary depending upon the reaction product being used, the amount of asbestos being treated and rate of treatment. During the spray treatment the asbestos material is agitated, preferably by stirring or tumbling within the mixing device or container in which it is held. Preferably, between 5 and 10 parts by weight of asbestos of the anti-dusting reaction product is employed. Especially good inhibition of chrysotile asbestos fiber dusting levels have been obtained when about 7 to 8 parts by weight of asbestos fibers of the anti-dusting agent is sprayed over a thirty minute period onto the tumbling asbestos fibers.

The anti-dusting agents of this invention are preferably prepared by reacting approximately equimolar proportions of the polyhydroxy alkyne derivative compound and the $C_2 - C_6$ carboxylic acid or anhydride. However, the precise amount of either constituent is not critical and may be varied depending upon the type, size, and dusting tendency of the asbestos fiber to be treated. The esterification reaction is carried out using conventional esterification techniques (and catalysts in the case of the carboxylic acids) which are well known to those skilled in the art. Generally speaking, the anti-dusting reaction products are viscous liquids which may be used to treat the dry asbestos fibers by spraying, mixing or any other suitable technique which ensures that a large portion of the surface area of the asbestos fibers to be treated are likely to be exposed to the esterified anti-dusting agent.

The following examples illustrate the manner of preparing asbestos fibers having reduced dusting properties in accordance with this invention.

EXAMPLE I

Five hundred grams of Union Carbide "RG-144 Calidria", purified chrysotile asbestos containing about $1.0 \times 10^{14}$ colloidal fibers per gram of material and exhibiting the approximate physical characteristics set forth in Table I was charged into a large mechanical mixer.

An anti-dusting agent for treating the fibers was prepared by reacting one mole of trimethylol propane and one mole of acetic anhydride for about 60 minutes. After the esterification reaction had been terminated, a partially esterified (about 15%) reaction product having the structure shown in FIG. 1 herein was isolated. Thirty-seven and one half grams of the isolated reaction product was loaded into an industrial sprayer whose nozzles were positioned within the mixing device containing the dry asbestos fibers. The mixing device motor was then started and the esterified reaction product sprayed in mist fashion, at a uniform rate through the nozzles onto the dry asbestos fibers which were being agitated in the mixing device. The spraying operation was carried out at a uniform rate for about 30 minutes at which time the liquid anti-dusting agent had been completely sprayed onto the asbestos fibers in the mixing device. The fibers were then allowed to dry at room temperature.

The tendency of the fibers treated in accordance with this example to become airborne particles was compared to untreated fibers using the following procedure: a two pound sample of asbestos fibers treated in accordance with Example I was rapidly poured between two open mouthed containers. Samples of the particulate matter in the air immediately adjacent to the pouring area were collected on membrane filters of 0.8 micrometer porosity mounted in open face filter holders. The same procedure was followed for the untreated asbestos fibers. In each case, the membrane filter was exposed to the atmosphere adjacent the pouring site for a period of fifteen minutes from the time that the asbestos pouring operation was commenced. After the sampling period had been terminated, each filter was microscopically examined at 400–450X (magnification) with a four millimeter objective using phase contrast illumination. The membrane filter which was exposed to the untreated asbestos fibers entrapped approximately four times as many asbestos fibers having a length of about five micrometers or longer on its surface than the identical filter exposed to the asbestos fibers treated in accordance with Example I.

EXAMPLE II

The same operation was carried out as in Example I, except that the esterification reaction was allowed to continue until the reaction product (anti-dusting agent) was approximately 30% esterified and fifteen parts by weight (75 grams) of the esterified anti-dusting agent was applied to 500 grams of the asbestos fibers.

The particulate assay of the dusting level of the asbestos fibers treated in accordance with this example was carried out according to the sampling procedure outlined in Example I. The membrane filter exposed to the treated asbestos fibers contained approximately one-fourth the number of asbestos fibers having a length of about 5 micrometers or longer as compared with the membrane filter exposed to the untreated asbestos sample.

The treated asbestos fibers of Examples I and II were successfully used as rheological additives in several different plastisols and organosols designed for end use applications as modifiers in adhesives, coatings and mastics. Use of the treated asbestos fibers of this invention as additives conferred substantially identical rheological properties to all the organosols and plastisols as addition of untreated asbestos fibers.

While not wishing to be bound by any particular theory of operation for the invention, it is believed that the partially esterified reaction product (anti-dusting agent) forms a thin coating on each asbestos fiber thereby inhibiting its ability to become airborne without affecting its specialized rheological properties.

What is claimed is:

1. A method of processing asbestos fibers to inhibit dusting of said fibers which comprises charging asbestos fibers of from about 1 to about 25 micrometers in length into a treatment zone, coating said asbestos fibers with an effective amount to inhibit fiber dusting of an anti-dusting agent consisting essentially of the partially esterified reaction product of a polyhydroxy compound derived from a $C_2$ to $C_6$ alkyne and a compound selected from the group consisting of saturated and unsaturated $C_1$ through $C_6$ carboxylic acids and their anhydrides for a predetermined time period, agitating said fibers during said coating step and drying said fibers at room temperature after agitation.

2. The method according to claim 1 wherein said effective amount for inhibiting dusting comprises from about 2 to about 25 parts by weight of said asbestos fibers of said anti-dusting agent.

3. The method according to claim 2 wherein said polyhydroxy compound is partially esterified up to about 80% with lower aliphatic acids.

4. The method according to claim 3 wherein said polyhydroxy compound is selected from the group consisting of ethylene, propylene and butylene glycol, glycerine, pentaerythritol, di and tri-pentaerythritol, sorbitol, dextrose, trimethylolethane, and trimethylol propane.

5. The method according to claim 3 wherein said polyhydroxy compound is trimethylol propane.

6. A method according to claim 2 wherein said acid is selected from the group consisting of formic, acetic, propionic, butyric, isobutyric, valeric, trimethylacetic and caproic acids.

7. A method according to claim 3 wherein said polyhydroxy compound is trimethylolethane.

8. A method according to claim 7 wherein said carboxylic acid is acetic acid.

9. An anti-dusting asbestos particle which comprises a chrysotile asbestos fiber coated with a composition consisting essentially of the partially esterified reaction product of an ester of a polyhydroxy derivative of a $C_2 - C_6$ alkyne and a compound selected from the group consisting of saturated and unsaturated $C_1 - C_6$ carboxylic acids and their anhydrides said fiber being from about 1 to about 25 micrometers in length and said coated particle being dry.

10. An anti-dusting asbestos particle as recited in claim 9 wherein said polyhydroxy compound is selected from the group consisting of ethylene, propylene and butylene glycol, glycerine, pentaerythritol, di- and tri-pentaerythritol, sorbitol, dextrose, trimethylolethane, and trimethylol propane.

11. An anti-dusting asbestos particle as recited in claim 9 wherein said acid is selected from the group consisting of formic, acetic, propionic, butyric, isobutyric, valeric, trimethylacetic and caproic acids.

12. An anti-dusting asbestos particle as recited in claim 9 wherein said acid anhydride is selected from the group consisting of formic anhydride, acetic anhydride, propionic anhydride, butyric anhydride, isobutyric anhydride, valeric anhydride, trimethylacetic anhydride and caproic anhydride.

13. An anti-dusting asbestos particle as recited in claim 12 wherein said polyhydroxy compound is trimethylol propane and said anhydride is acetic anhydride.

14. An anti-dusting asbestos particle as recited in claim 11 wherein said polyhydroxy compound is trimethylol propane and said acid is acetic acid.

15. An anti-dusting asbestos composition comprising a plurality of finely divided asbestos fibers from about one to about 25 micrometers in length coated with an effective amount for inhibiting asbestos fiber dusting of an anti-dusting agent consisting essentially of the reaction product of a polyhydroxy compound which has been partially esterified from about 0 to about 80% with a lower aliphatic acid anhydride said coated particles being dry.

16. An anti-dusting asbestos composition as recited in claim 15 wherein said polyhydroxy compound is trimethylol propane.

17. An anti-dusting asbestos composition as recited in claim 16 wherein said lower aliphatic acid anhydride is acetic anhydride.

18. An anti-dusting asbestos composition as recited in claim 15 wherein said asbestos fibers are formed from chrysotile asbestos.

* * * * *